US009287963B2

United States Patent
Parish et al.

(10) Patent No.: US 9,287,963 B2
(45) Date of Patent: Mar. 15, 2016

(54) RELAY MODULES FOR COMMUNICATION WITHIN A MESH NETWORK

(71) Applicant: Mueller International, LLC, Atlanta, GA (US)

(72) Inventors: Edward C. Parish, North Reading, MA (US); James Ola Williams, Marlborough, MA (US); David Edwin Splitz, Sandwich, MA (US)

(73) Assignee: Mueller International, LLC, Atlanta, GA (US)

( * ) Notice: Subject to any disclaimer, the term of this patent is extended or adjusted under 35 U.S.C. 154(b) by 249 days.

(21) Appl. No.: 13/800,717

(22) Filed: Mar. 13, 2013

(65) Prior Publication Data

US 2013/0281008 A1    Oct. 24, 2013

Related U.S. Application Data

(60) Provisional application No. 61/636,611, filed on Apr. 20, 2012.

(51) Int. Cl.
*H04B 7/14* (2006.01)
*H04B 7/155* (2006.01)

(52) U.S. Cl.
CPC . *H04B 7/14* (2013.01); *H04B 7/155* (2013.01)

(58) Field of Classification Search
CPC ............. H04B 7/14; H01Q 1/242; H01Q 9/30
USPC ........ 455/7; 343/715, 702, 900, 906; 439/916
See application file for complete search history.

(56) References Cited

U.S. PATENT DOCUMENTS

| | | | |
|---|---|---|---|
| 3,044,435 A * | 7/1962 | Reardon | E03B 9/06 116/173 |
| 4,908,249 A * | 3/1990 | Lines | E01F 9/0111 248/214 |
| 4,914,450 A * | 4/1990 | Dilley | H01Q 1/20 343/715 |
| 5,659,300 A | 8/1997 | Dresselhuys et al. | |
| 6,369,769 B1 | 4/2002 | Nap et al. | |
| 6,816,072 B2 | 11/2004 | Zoratti | |
| 6,943,749 B2 * | 9/2005 | Paun | H01Q 1/38 343/700 MS |
| 7,012,546 B1 | 3/2006 | Zigdon et al. | |
| 7,053,767 B2 | 5/2006 | Petite et al. | |
| 7,103,511 B2 | 9/2006 | Petite | |
| 7,164,389 B1 * | 1/2007 | Platt | H01Q 1/242 343/790 |
| 7,209,840 B2 | 4/2007 | Petite et al. | |
| 7,346,463 B2 | 3/2008 | Petite et al. | |
| 7,453,373 B2 | 11/2008 | Cumeralto et al. | |
| 7,508,318 B2 | 3/2009 | Casella et al. | |
| 7,535,378 B2 | 5/2009 | Cornwall | |

(Continued)

OTHER PUBLICATIONS

Paris, Edward C.; U.S. Patent Application entitled: Tamper-Resistant Relay Modules for Communication within a Mesh Network, having U.S. Appl. No. 13/840,637, filed Mar. 15, 2013; 41 pgs.

(Continued)

*Primary Examiner* — Edward Urban
*Assistant Examiner* — Ralph H Justus
(74) *Attorney, Agent, or Firm* — Taylor English Duma LLP

(57) ABSTRACT

The present disclosure relates to devices, systems, and methods for relaying data. An exemplary device includes a relay module comprising: a mast having an inner surface and an outer surface, the inner surface defining a cavity; an antenna disposed within the cavity; and a mounting device coupled to the mast and engageable with a utility structure.

20 Claims, 13 Drawing Sheets

(56) References Cited

U.S. PATENT DOCUMENTS

| | | |
|---|---|---|
| 7,786,893 B2 | 8/2010 | Fuller et al. |
| 7,948,396 B2 | 5/2011 | Cornwall |
| 8,013,732 B2 | 9/2011 | Petite et al. |
| 8,823,509 B2 | 9/2014 | Hyland et al. |
| 2009/0153357 A1* | 6/2009 | Bushman ............... G01D 4/008 340/870.02 |
| 2010/0007521 A1 | 1/2010 | Cornwall |
| 2011/0308638 A1* | 12/2011 | Hyland .................... E03B 9/06 137/299 |
| 2013/0222194 A1 | 8/2013 | Albert |

OTHER PUBLICATIONS

Parish, Edward; U.S. Provisional Patent Application entitled: Relay Modules for Communication within a Mesh Network, having U.S. Appl. No. 61/636,611, filed Apr. 20, 2012, 31 pgs.

Parish, Edward; International Preliminary Report on Patentability for serial No. PCT/US2013/035874, filed Apr. 10, 2013, mailed Oct. 21, 2014, 12 pgs.

Parish, Edward; PCT Application entitled: Relay Modules for Communication Within a Mesh Network, having serial No. PCT/US13/35874, filed Apr. 10, 2013, 42 pgs.

Parish, Edward; International Search Report and Written Opinion for serial No. PCT/US2013/035874, filed Apr. 10, 2013, mailed Jun. 17, 2013, 13 pgs.

Parish, Edward C.; Non-Final Office Action for U.S. Appl. No. 13/840,637, filed Mar. 15, 2015, mailed Jan. 15, 2015, 28 pgs.

Parish, Edward C.; Applicant-Initiated Interview Summary for U.S. Appl. No. 13/840,637, filed Mar. 15, 2013, mailed Sep. 11, 2015, 4 pgs.

Parish, Edward C.; Final Office Action for U.S. Appl. No. 13/840,637, filed Mar. 15, 2013, mailed Jul. 29, 2015, 17 pgs.

Parish, Edward C.; Non-Final Office Action for U.S. Appl. No. 13/840,637, filed Mar. 15, 2013, mailed Dec. 17, 2015, 18 pgs.

* cited by examiner

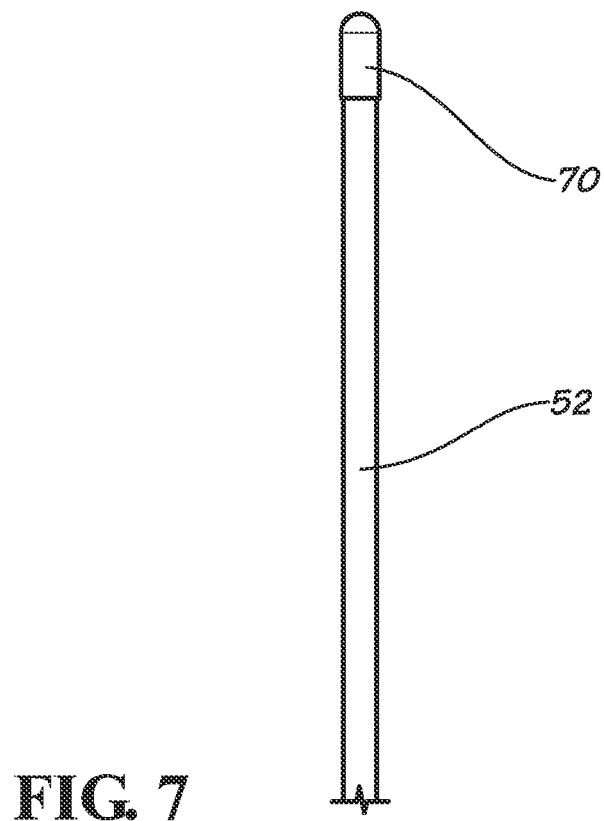
FIG. 7
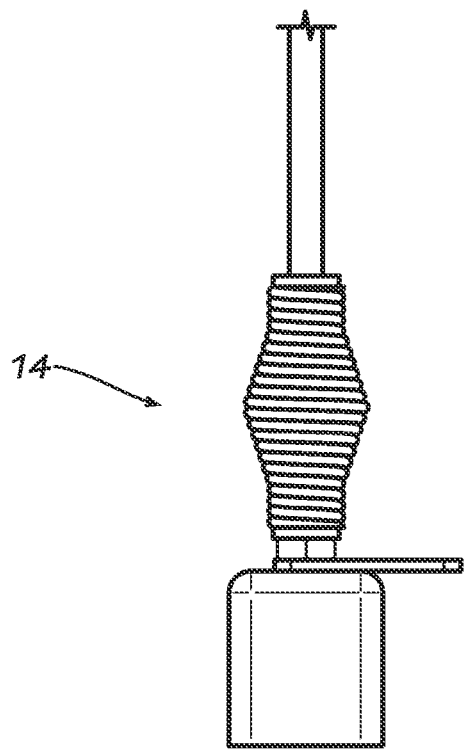

RELAY MODULES FOR COMMUNICATION WITHIN A MESH NETWORK

REFERENCE TO RELATED APPLICATIONS

This application claims priority to U.S. Provisional Application No. 61/636,611, filed Apr. 20, 2012, which is hereby specifically incorporated by reference herein in its entirety.

TECHNICAL FIELD

The present disclosure generally relates to mesh networks, and more particularly relates to devices for relaying signals within a mesh network.

BACKGROUND

Typically, utility meters (e.g., gas meters, water meters, and electricity meters) are read manually by meter readers who are employees or contractors of the various utility providers. Manual meter reading represents a significant cost to a typical utility provider. With the advent of wireless technology including mesh networking, utility providers have sought methods and systems for remote reading of water meters and/or remote control of water supply valves.

Advanced Metering Infrastructure (AMI), Advanced Meter Reading (AMR), or Advanced Metering Management (AMM) are systems that measure, collect, and analyze utility data using advanced metering devices such as water meters, gas meters, and electricity meters. The advanced metering devices combine internal data measurements with continuously available remote communications, enabling the metering devices to transmit and receive data through the AMI, AMR, and/or AMM network. In a typical configuration, an advanced metering device, such as an advanced water meter, measures and collects usage data, such as water usage data, at a customer's location. The metering device then uses a built-in communication interface to transmit data to a parent node up the network, sometimes in response to the parent's request for such information or on a predefined schedule, such as once a day. In this way, utility providers may remotely "read" customer usage data for billing purposes.

SUMMARY

The present disclosure relates to devices, systems, and methods for relaying data. An exemplary device includes a relay module comprising: a mast having an inner surface and an outer surface, the inner surface defining a cavity; an antenna disposed within the cavity; and a mounting device coupled to the mast and engageable with a utility structure.

Also included is a relay module system including a utility structure; a mast having an inner surface and an outer surface, the inner surface defining a cavity; an RF circuit including an antenna, the antenna disposed within the cavity of the mast; and a mounting device fastening the mast to the utility structure.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

FIG. 7 is a side view of the embodiment of the relay module of FIG. 2.

DETAILED DESCRIPTION

The present disclosure describes systems and methods for wirelessly transmitting meter data from a plurality of nodes to a central location (e.g., a central office of a utility company). Existing Advanced Metering Infrastructure (AMI) deployments rely on and utilize mesh networks and mesh networking devices to transmit and to receive data between nodes within the utility provider's network. Many of these devices employ frequency-hopping spread spectrum (FHSS) technology in compliance with Federal Communications Commission (FCC) rules and regulations part 15 (47 C.F.R. §15). FHSS is a method of transmitting and receiving radio signals by rapidly switching among many frequency channels using a pseudorandom channel sequence known to both the transmitting and receiving devices.

Because of the remote placement nature of some advanced metering devices, it is desired to extend the range of the advanced metering devices by providing repeaters throughout the geographic area of the mesh network. In this way, the mesh network's range can be easily and inexpensively broadened while increasing communicative reliability. In addition, stand-alone repeaters are necessary when there are no other advanced metering devices within the range of the advanced metering device that have the capacity to act as a repeater. Further, a mesh network allows for multiple communication paths in case of a node or repeater failure.

While the present disclosure relates to mesh networking, the present disclosure may be utilized in other types of networking environments, such as point-to-point FHSS networks as well, as those having ordinary skill in the art will recognize.

Utility companies must periodically determine customer usage by taking meter readings. To facilitate this process and to reduce costs to the utility companies, utility meters in the present disclosure may transmit usage data wirelessly through a network, such as a mesh network, back to the utility provider. In various embodiments, this may include a collection unit or repeater polling the individual advanced meter devices, optionally at specific times, or the advanced metering devices pushing their data automatically back to the utility provider, also optionally at specific times.

Figure 1:
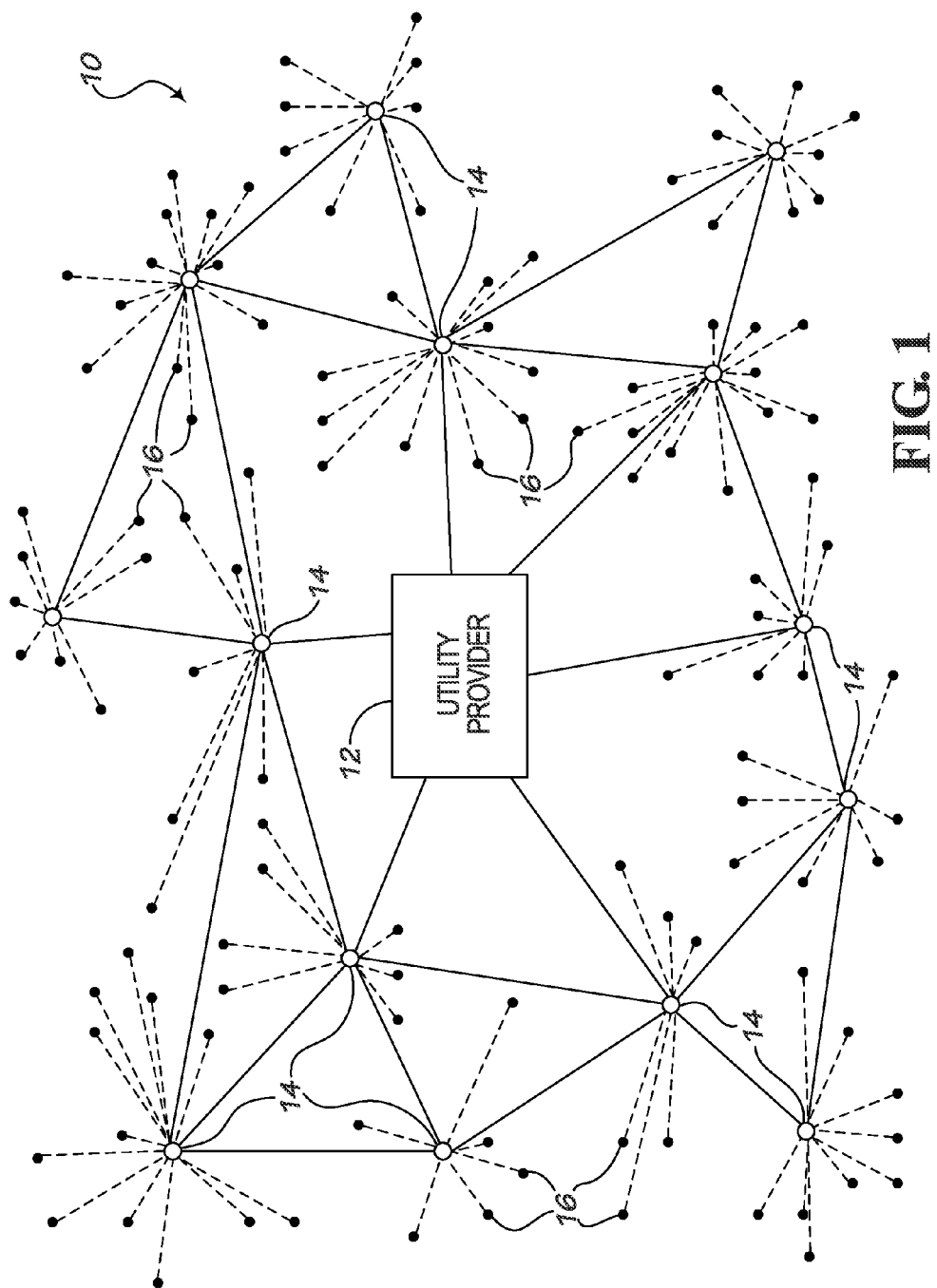
FIG. 1 is a block diagram of a mesh network, according to various implementations of the present disclosure.

FIG. 1 is a block diagram illustrating an embodiment of an AMI mesh network 10. The AMI mesh network 10 includes a utility provider 12, a plurality of relay modules 14 (shown as circles), and a plurality of meters 16 (shown as dots). The utility provider 12 may also include collector units. The configuration of the utility provider 12, relay modules 14, and meters 16 in FIG. 1 is merely one example and should not be seen as limiting; numerous other configurations may be used and may be otherwise advantageous. As such, the elements of FIG. 1 may be arranged in alternative configurations with any number of utility providers 12, relay modules 14, and meters 16. Additionally, meters 16 may be one or more of water meters, gas meters, electricity meters, etc., or may be other types of appliances. Further, meters 16 may also serve as relay modules 14, meaning that the meters 16 and the relay modules 14 may provided as a single unit.

The dashed lines of FIG. 1 represent wireless communication links between the meters 16 and respective relay modules 14. Meter data may be transmitted wirelessly from the respective meter 16 to an associated relay module 14 or from the respective meter 16 to another associated meter 16. The solid lines between one relay module 14 and another represents wireless or wired communication among the relay modules 14 for transmitting the meter data. The solid lines between the relay modules 14 and the utility provider 12 represent additional wireless or wired communication links for communicating the meter data to the utility provider 12, such as through the collector units of the utility provider 12. The arrangement of communication links among the elements of the FIG. 1 is also exemplary and may be configured in alternative arrangements. For example, all of the communication links may be either wired or wireless or any combination thereof. Communication may be active during some periods of time and may be inactive during other periods of time, depending on when meter data is intended to be sent to the utility provider 12.

The meters 16 of FIG. 1 may be configured to detect any parameter as needed. For example, the meters 16 may detect a parameter associated with the utility provider 12. The meters 16, for instance, may detect water usage, gas usage, electricity usage, or other data, either quantitative or qualitative. Each meter 16 may be installed on a customer's premises, such as attached to an outside or inside surface of a house on the premises or near the street in front of the customer's house.

The relay modules 14 may be configured to receive data from the proximate meters 16 and relay the data to the utility provider 12, such as through the collector units of the utility provider 12. The relay modules 14 may be connected to public or government property in the vicinity of the meters 16 from which they are intended to receive meter data. The public or government property may include property or assets associated with a state or local government, such as a department of motor vehicles. In this regard, the property may include traffic signs or poles, traffic control equipment, etc. The property may also include property or assets associated with one or more utility companies, such as a gas company, electric company, water company, etc. In this regard, the property may include fire hydrants, telephone poles, lamp posts, electrical transformer cabinets, etc. Alternatively, the property may include property or assets associated with one or more private parties. Therefore, the relay modules 14 may be attached in any suitable manner to property or assets that may be positioned in strategic locations. For example, the relay modules 14 may be able to more easily receive meter data from meters 16 when positioned near the transmitting meters 16, such as on a fire hydrant near the residences associated with the transmitting meters 16.

Figure 2:
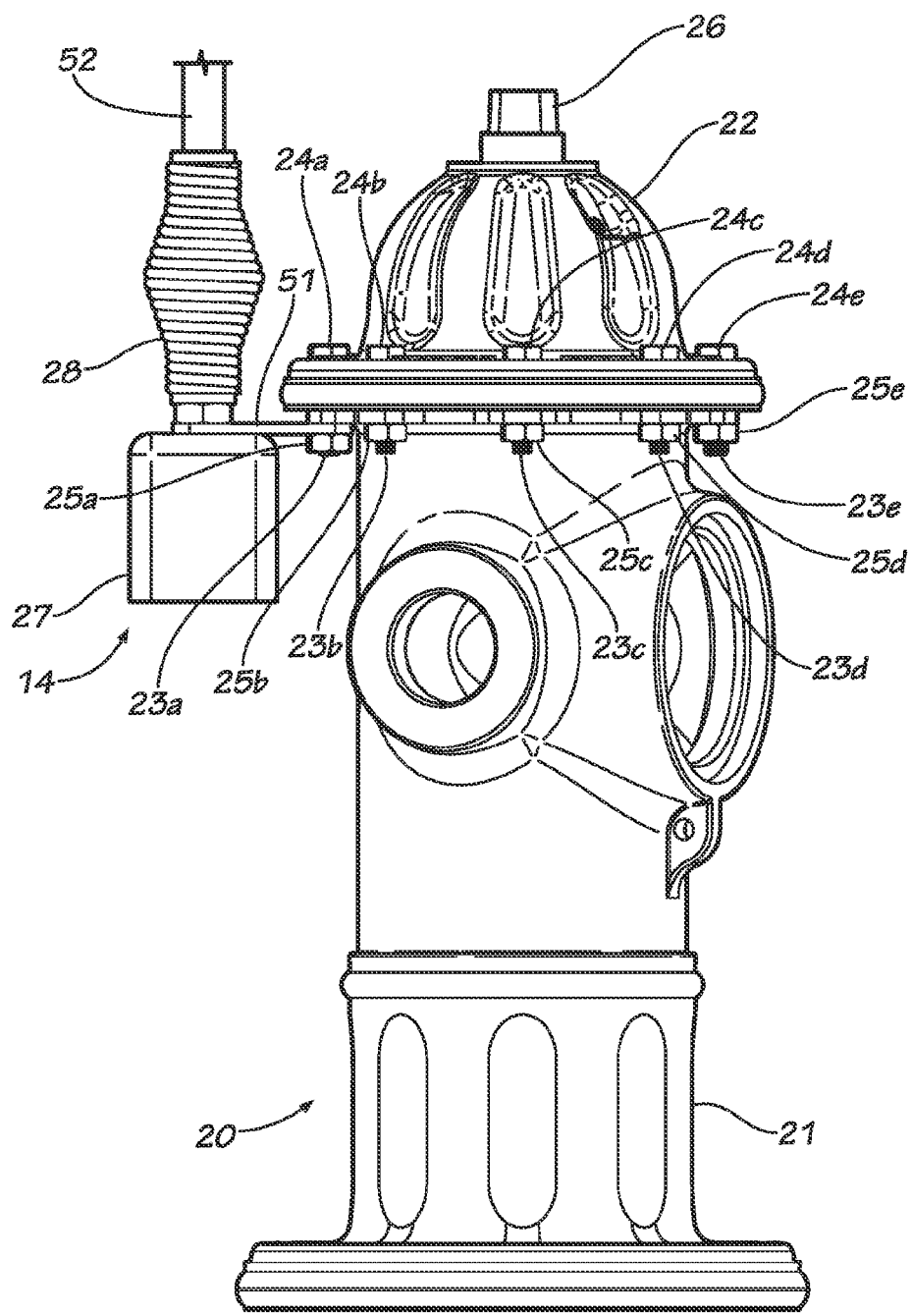
FIG. 2 is a diagram showing an embodiment of a relay module mounted on a fire hydrant, according to various implementations of the present disclosure.

FIG. 2 shows one embodiment of a relay module 14 mounted on a fire hydrant 20. The fire hydrant 20 includes a hydrant body 21 and a bonnet 22. The bonnet 22 may include a plurality of bonnet fastener holes 35$a,b,c,d,e,f,g,h$ (not shown). The hydrant body 21 may include a plurality of hydrant body fastener holes 36$a,b,c,d,e,f,g,h$ (not shown). The hydrant body 21 may be coupled to the bonnet 22 by a plurality of adjustably tightenable fasteners 23$a,b,c,d,e,f,g,h$ (23$f,g,h$ shown in FIG. 3) disposed within the plurality of bonnet fastener holes 35$a,b,c,d,e,f,g,h$ and the plurality of hydrant body fastener holes 36$a,b,c,d,e,f,g,h$. The bonnet 22 may alternatively be coupled to the hydrant body 21 by any known method, such as a bayonet connector or a single nut. Each adjustably tightenable fastener 23$a,b,c,d,e,f,g,h$ includes a bolt 24$a,b,c,d,e,f,g,h$ (24$f,g,h$ shown in FIG. 3) and a nut 25$a,b,c,d,e,f,g,h$ (25$f,g,h$ not shown) fastening the bonnet to the hydrant body 21 when each nut 25$a,b,c,d,e,f,g,h$ is tightened onto each bolt 24$a,b,c,d,e,f,g,h$. An operating nut 26 is disposed at the top of the bonnet 22.

The relay module 14 is mounted on the fire hydrant 20 by a mounting device. In the current embodiment, the mounting device is a mounting bracket 51, although the relay module 14 may be mounted on the fire hydrant 20 using any suitable type of mounting device, such as a strap, clamp, magnet, key fit arrangement, and fasteners, among others. For example, in embodiments of the fire hydrant 20 in which the bonnet 22 is coupled to the hydrant body 21 by a means other than adjustably tightenable fasteners 23$a,b,c,d,e,f,g$, the mounting device may be a stainless steel strap enwrapping the hydrant body 21. Optionally, the mounting device for mounting the relay module 14 to the fire hydrant 20 may be tamper-resistant. In one embodiment, the mounting bracket 51 includes a mounting fastener hole 61 (shown in FIG. 6). One of the bolts, for example bolt 24$a$, extends through the mounting fastener hole 61, securing the mounting bracket 51 in place when one of the nuts, such as nut 25$a$, is tightened on the bolt, such as bolt 24$a$, extending through the mounting fastener hole 61. The mounting fastener hole 61 may be sized to be larger than the stem of the bolt 24 but smaller than the width of the nut 25. The relay module 14, as described in more detail below, may also include a radio housing 27, a spring 28, an antenna 80 (shown in FIG. 8), and a mast 52.

Figure 3:
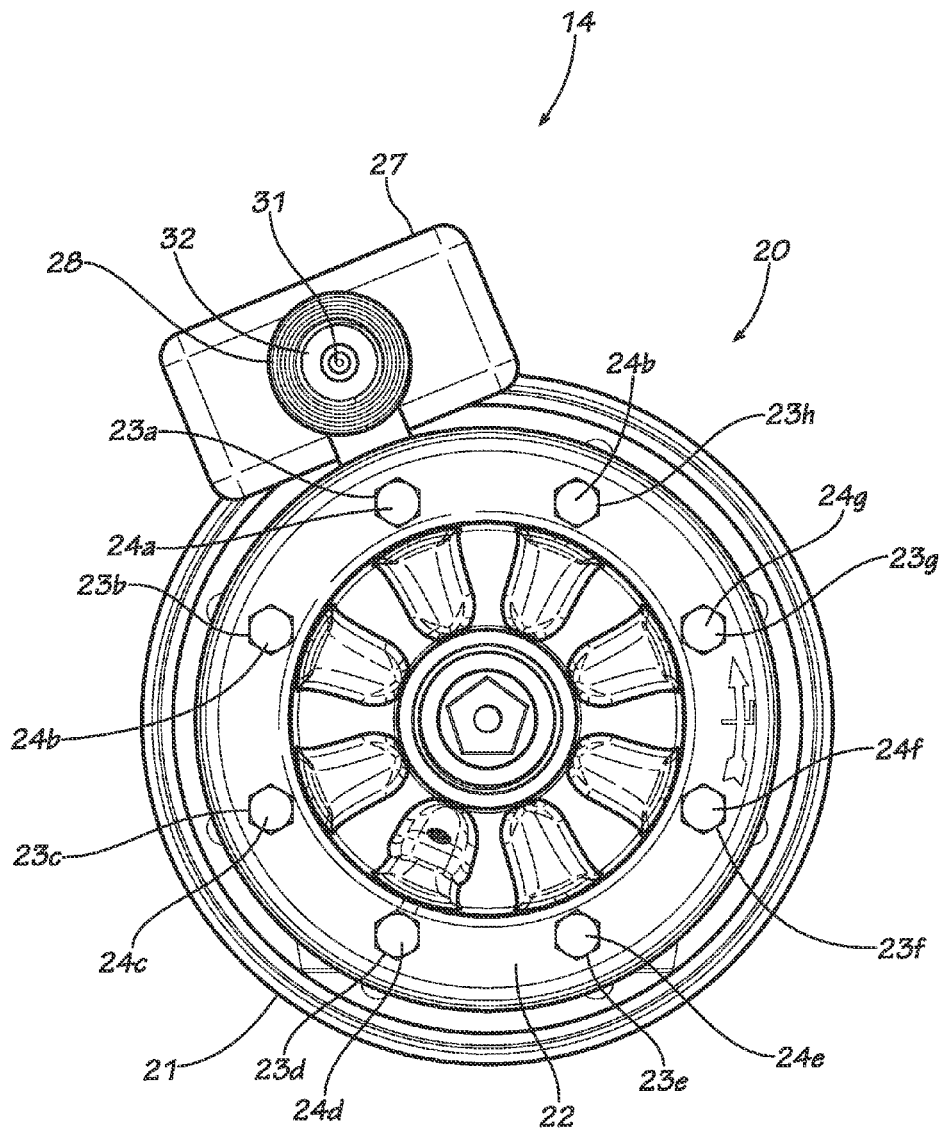
FIG. 3 is a top view of the embodiment of the relay module mounted on the fire hydrant of FIG. 2.

FIG. 3 shows a top view of fire hydrant 20 and relay module 14. In one embodiment, the fire hydrant 20 includes eight bonnet fastener holes 35$a,b,c,d,e,f,g,h$, eight hydrant body fastener holes 36$a,b,c,d,e,f,g,h$, and eight adjustably tightenable fasteners 23$a,b,c,d,e,f,g,h$, including eight bolts 24$a,b,c,d,e,f,g,h$ and eight nuts 25$a,b,c,d,e,f,g,h$ (not shown), although a different amount of fasteners and fastener holes, including no fasteners and no fastener holes, may be included in other embodiments. The mast 52 is removed in this view, showing an RF connector 31 and an upper spring insert 32 disposed within the spring 28. The RF connector attaches to the antenna 80 through a wired connection 81 (shown in FIG. 9). The wired connection 81 may be a coaxial cable.

Figure 4:
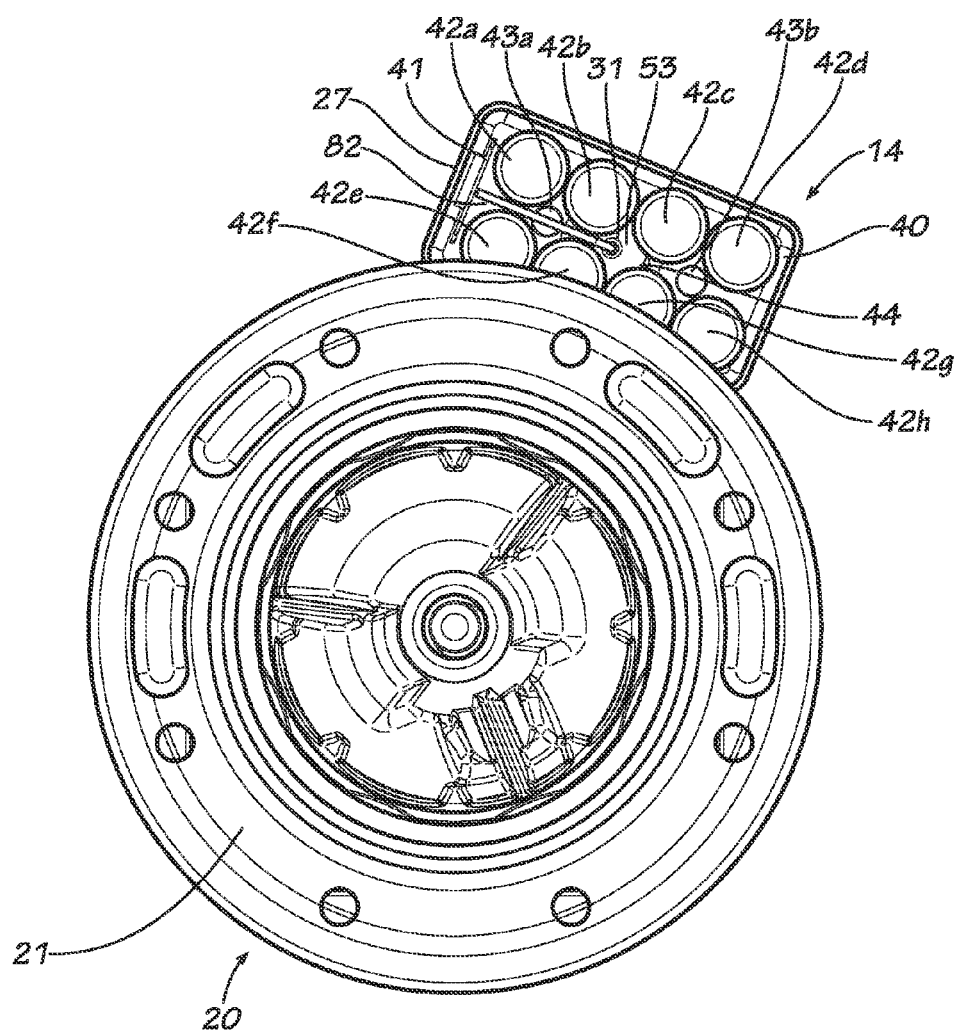
FIG. 4 is a bottom view of the embodiment of the relay module mounted on the fire hydrant of FIG. 2.

FIG. 4 shows a bottom view of the fire hydrant 20 and relay module 14, with the bottom of the radio housing 27 removed to show the housing interior 40 of the radio housing 27. The housing interior 40 holds components of the relay module 14. These components may include batteries, circuit boards, capacitors, memory storage, etc. In the current embodiment, the components include a circuit board 41, a plurality of batteries 42$a,b,c,d,e,f,g,h$, and a plurality of capacitors 43$a,b$ (43$c,d$ not shown). In one embodiment, there are eight batteries 42a,b,c,d,e,f,g,h and four capacitors 43a,b,c,d, though a different number of batteries 42 and capacitors 43 may be used in other embodiments, including no batteries 42 or no capacitors 43. A second wired connection 82 is shown running from the RF connector 31 to the circuit board 41. The second wired connection 82 may be a coaxial cable. The circuit board 41, batteries 42, capacitors 43, RF connector 31, and antenna 80 form an RF circuit 200, as described in more detail below, though other circuits may be used in other embodiments. The RF connector 31 and a lower spring insert 53 are also shown through an access hole 44 in the top of the radio housing 27.

Figure 5:
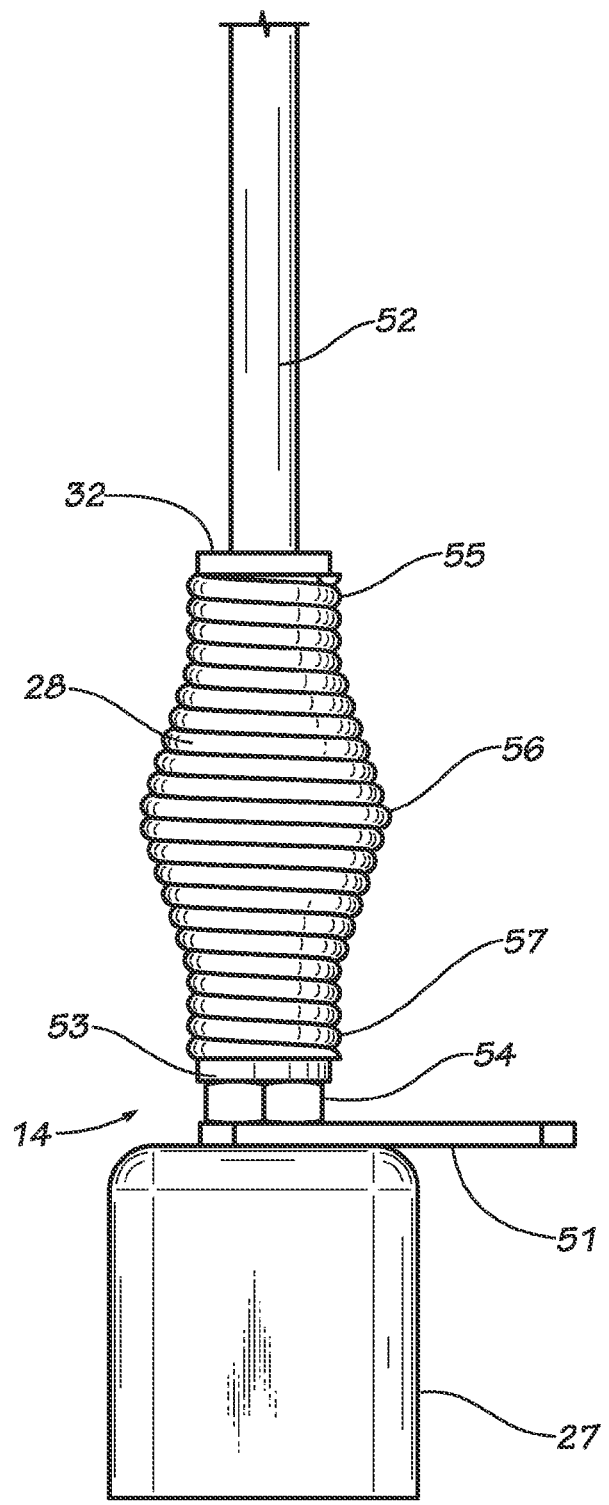
FIG. 5 is a sectional view of the embodiment of the relay module of FIG. 2.

FIG. 5 shows a side view of the relay module 14. FIG. 5 shows the radio housing 27, the spring 28, the mounting bracket 51, the mast 52, the upper spring insert 32, and the lower spring insert 53, as well as a jam nut 54. The spring 28 includes an upper section 55, a middle section 56, and a lower section 57. In one embodiment, the upper section 55 and the lower section 57 each have a diameter equal to each other and the middle section 56 has a diameter greater than the diameters of the upper section 55 and the lower section 57. In other embodiments, the upper section 55, middle section 56, and lower section 57 may have equal diameters or any other combination of diameters. Additionally, in other embodiments, the relay module 14 may lack one, a combination of, or all of the radio housing 27, spring 28, upper spring insert 32, lower spring insert 53, or jam nut 54.

Figure 6:
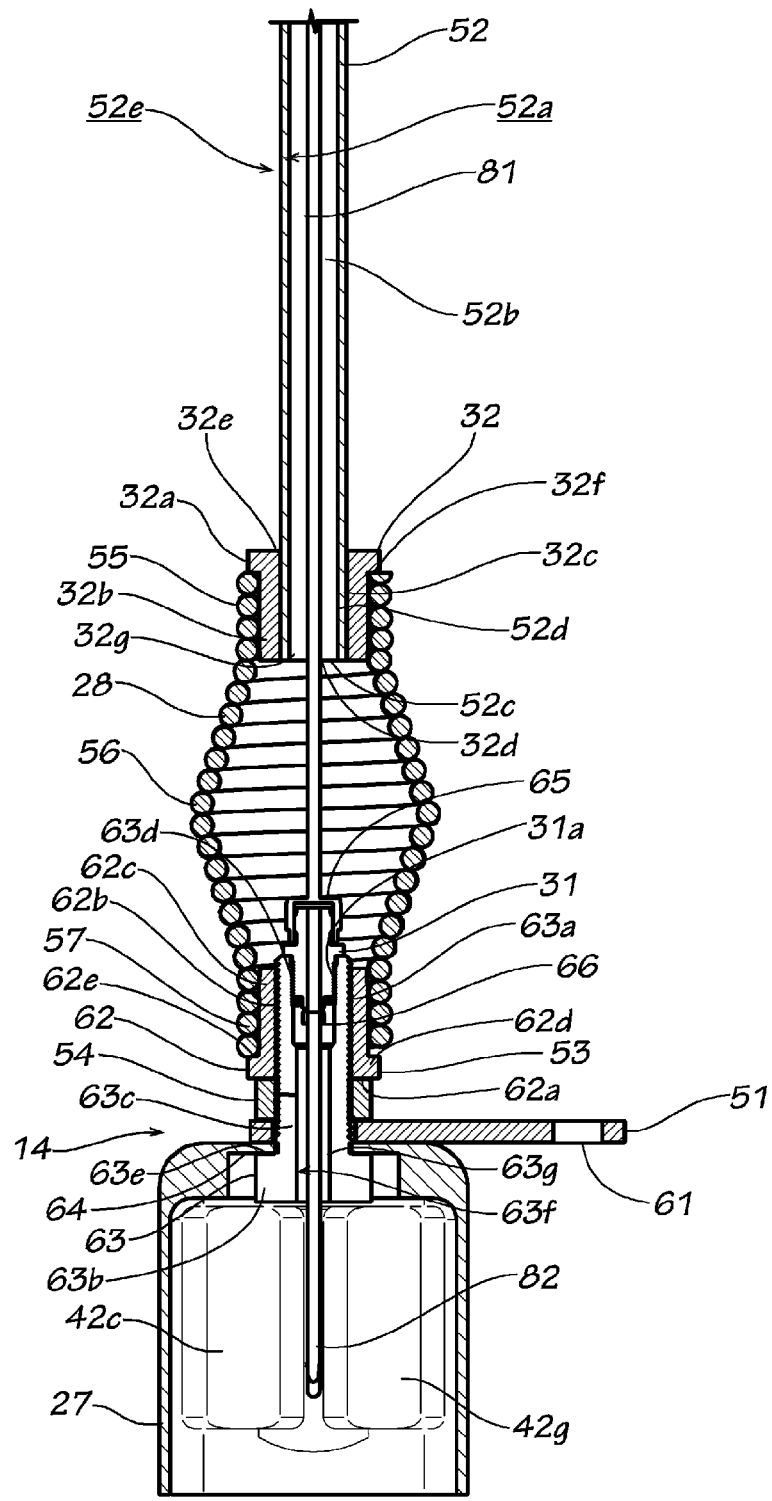
FIG. 6 is a second sectional view of the embodiment of the relay module of FIG. 2.

FIG. 6 shows a cross-sectional view of the relay module 14 of FIG. 5. FIG. 6 shows the radio housing 27, the spring 28, the mounting bracket 51, the mast 52, the upper spring insert 32, the lower spring insert 53, the jam nut 54, the RF connector 31, the wired connection 81, the second wired connection 82 and batteries 42c,g. The mounting fastener hole 61 of the mounting bracket 51 is also shown. A cross-section of the mast 52 is also shown. The mast 52 includes an inner surface 52a forming a cavity 52b. The cavity 52b is sized to accept and surround the antenna 80 (shown in FIG. 8) and the wired connection 81. The cavity 52b also ends at the bottom of the mast 52 in a lower opening 52c to allow the wired connection 81 between the RF connector 31 and the antenna 80. The mast 52 also includes a coupling portion 52d designed to engage a coupling portion 32c of the upper spring insert 32 to couple the mast 52 to the upper spring insert 32. In one embodiment, the coupling portion 52d of the mast 52 is coupled to the coupling portion 32c of the upper spring insert 32 by gluing or bonding, such as with a urethane adhesive. The mast 52 also includes an outer surface 52e, which may be reflective in some embodiments to allow for easier location of the fire hydrant 20. Optionally, mast 52 may be configured to include one or more lights to aid in visual detection of the fire hydrant 20.

The upper spring insert 32 includes an upper portion 32a and a lower portion 32b. The lower portion 32b is disposed within the upper section 55 of the spring 28, while the upper portion 32a is disposed outside of the spring 28. The lower portion 32b engages the upper section 55 of the spring 28 and couples the upper spring insert 32 to the spring 28. In one embodiment, the spring 28 is press-fitted into the upper spring insert 32, meaning the lower portion 32b of the upper spring insert 32 has an outer diameter larger than an inner diameter of the upper section 55 of the spring 28. Thus, when the upper spring insert 32 is inserted into the spring 28, the upper section 55 enwraps and holds the lower portion 32b, holding the upper spring insert 32 and the mast 52 in place. A shoulder 32f interacts with the spring 28 and acts as a stop to prevent the upper portion 32a from entering the spring 28. The upper spring insert 32 has a cavity 32g sized to accept the coupling portion 52d of the mast 52. The cavity 32g defines an upper opening 32e and a lower opening 32d, the lower opening 32d sized to allow the wired connection 81 between the RF connector 31 and the antenna 80.

The lower spring insert 53 includes an outer hex spring fastener 62 and an inner hex fastener 63. The outer hex spring fastener 62 has an upper portion 62c and a lower portion 62d, the upper portion 62c disposed within the lower section 57 of the spring 28 and the lower portion 62d disposed outside of the spring 28. The upper portion 62c includes inner threads 62b, the inner threads 62b engaging outer threads 63a of the inner hex fastener 63. The upper portion 62c engages the lower section 57 of the spring 28 and couples the lower spring insert 53 to the spring 28. In one embodiment, the spring 28 is press-fitted into the lower spring insert 53, meaning the upper portion 62c of the lower spring insert 53 has an outer diameter larger than an inner diameter of the lower section 57 of the spring 28. Thus, when the lower spring insert 53 is inserted into the spring 28, the lower section 57 enwraps and holds the upper portion 62c, and the lower spring insert 53 thus holds the spring 28 in place. The lower portion 62d includes an upper shoulder 62e interacting with the spring 28 and acts as a stop to prevent the lower portion 62d from entering the spring 28. The lower portion 62d also includes a lower shoulder 62a interacting with the jam nut 54.

The inner hex fastener 63 includes an inner surface 63f defining a cavity 63g sized to accept a second wired connection 82 between the RF connector 31 and the circuit board 41 (shown in FIG. 4) in the radio housing 27. The inner hex fastener 63 also includes an upper portion 63c and a lower portion 63b. The upper portion 63c includes the engaging outer threads 63a as well as inner threads 63d, the inner threads 63d engaging threads 31a of the RF connector 31 to secure the RF connector 31 in place. The lower portion includes a shoulder 63e interacting with a radio housing shoulder 64 in the radio housing 27 to hold the radio housing 27 to the mounting bracket 51. In combination, the inner hex fastener 63, the outer hex spring fastener 62, and the jam nut 54 act in concert to secure the radio housing 27, the spring 28, and the RF connector 31 in place and mounted to the mounting bracket 51.

The wired connection 81 connects the antenna 80 to the RF connector 31 and runs from the RF connector 31 through the spring 28 and the mast 52 to the antenna 80. The wired connection 81 may include a male connector 65 connecting the RF connector 31 to the wired connection 81. The second wired connection 82 can also be seen running from the RF connector 31 to the circuit board 41 (shown in FIG. 4). The second wired connection 82 may include a male connector 66 connecting the RF connector 31 to the second wired connection 82. In one embodiment, the wired connection 81 may have a larger diameter than the second wired connection 82.

FIG. 7 shows a full side view of the relay module 14. In the current embodiment, the mast 52 is tube-shaped and extends about two to five feet in length and about one inch in diameter, though other dimensions and shapes may be present in other embodiments. The relay module also includes a mast cap 70 at one distal end of the mast 52. In one embodiment, the mast cap 70 is coupled to the mast 52 by gluing or bonding, such as with a urethane adhesive.

Figure 8:
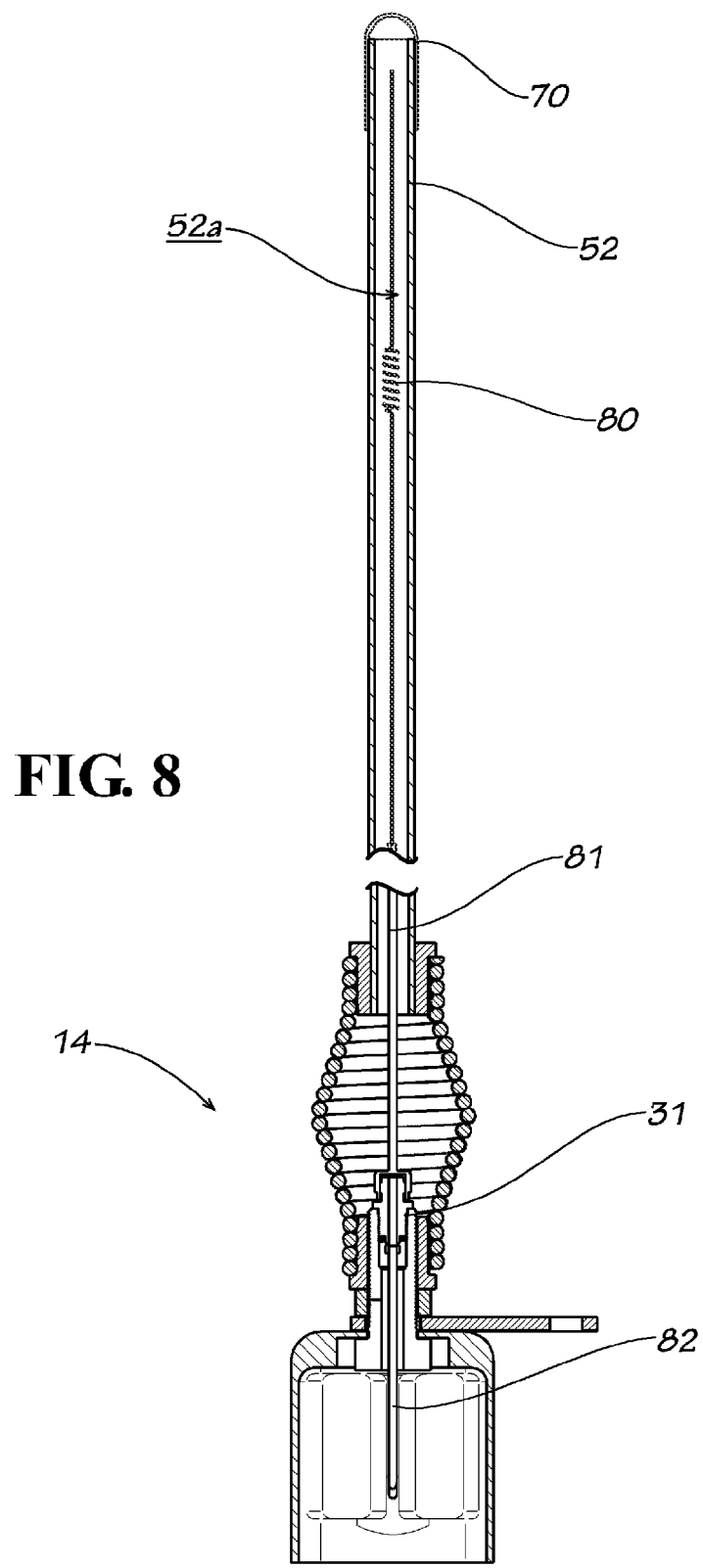
FIG. 8 is a third sectional view of the embodiment of the relay module of FIG. 2.

FIG. 8 shows another cross-sectional view of the relay module 14. The antenna 80 can be seen within the mast 52. In one embodiment, the relay module 14 may include spacers (not shown), such as insulating-type spacers, positioned between the antenna 80 and the inner surface 52a of the mast 52 to prevent contact between the antenna 80 and the mast 52. In one embodiment, the antenna 80 is held in place by the wired connection 81. For example, if the wired connection 81 is a coaxial cable, the stiffness of the coaxial cable may hold the antenna 80 in place.

In one embodiment, the antenna 80 is a collinear antenna array, though other antennas may be used in other embodiments. In one embodiment, an exemplary antenna, such as antenna 80, may include a Laird Technologies® vertically polarized omni antenna, including model numbers OD9-5, OD9-6, OD9-8, OD9-11, and OD-11D1. As one having ordinary skill in the art would recognize based on the present disclosure, it may be advantageous for the antenna 80 to radiate primarily downward, or at least to focus a majority of its radiation pattern downward. As such, an antenna such as the Laird Technologies® OD-11D1 may be preferable due to its down tilt radiation pattern. In one embodiment, the antenna 80 may be configured such that its vertical azimuth is 360-degrees omnidirectional, while its horizontal elevation plane is slightly downward, for example 1-degree. Of course, other configurations may be possible and/or preferable depending on the specific nature and requirements of the deployment of the relay module 14.

Figure 9:
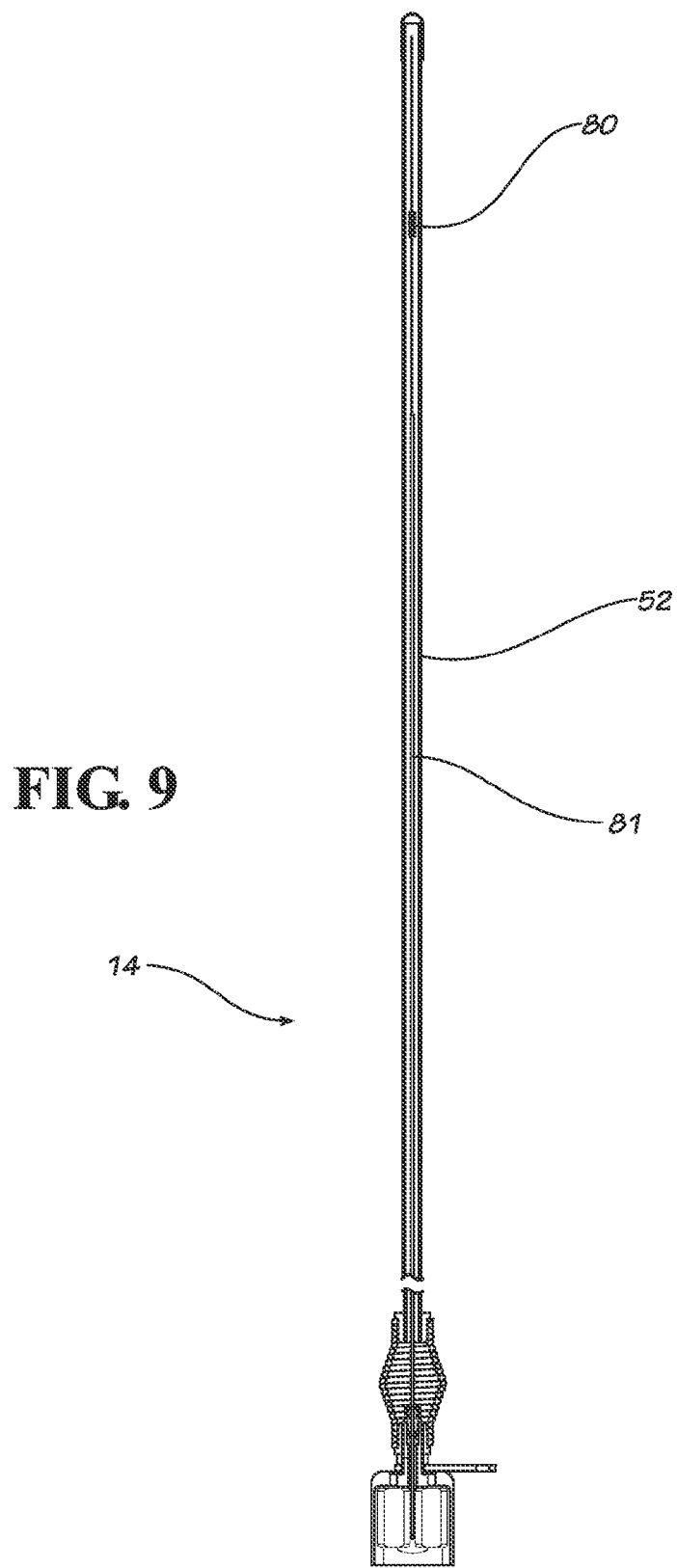
FIG. 9 is a fourth sectional view of the embodiment of the relay module of FIG. 2.

FIG. 9 shows another cross-sectional view of the relay module 14, showing the antenna 80 and the wired connection 81 within the mast 52 in full.

Figure 10:
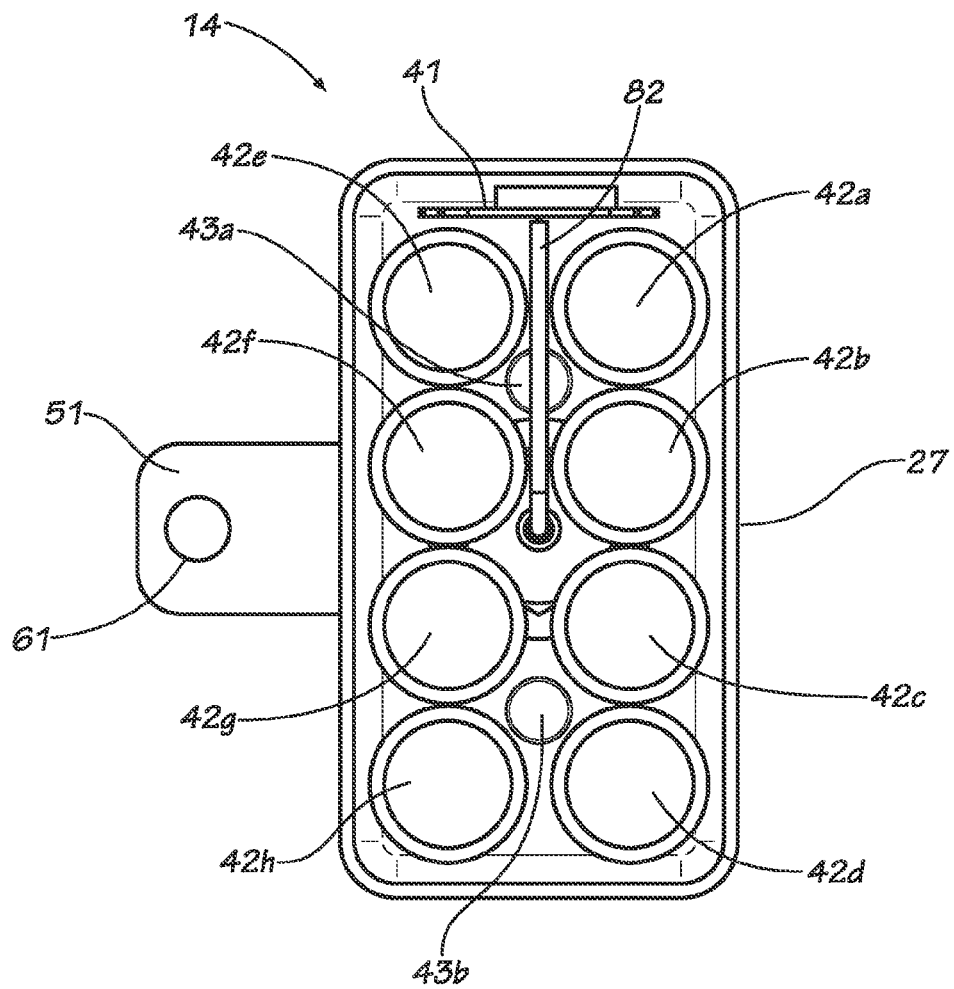
FIG. 10 is a fifth sectional view of the embodiment of the relay module of FIG. 2.

FIG. 10 shows a bottom cross-sectional view of the radio housing 27. The second wired connection 82 can be seen running from the RF connector 31 to the circuit board 41. In one embodiment, the second wired connection 82 is soldered at one end to the circuit board 41. The mounting bracket 51 and the mounting fastener hole 61 can also be seen in this view. In one embodiment, the radio housing 27 may be the mounting device and may include a surface closely fitting an outer diameter of the hydrant body 21 and a plurality of mounting fastener holes coupling the radio housing to the fire hydrant 20.

The circuit board 41, batteries 42 *a,b,c,d,e,f,g,h*, capacitors 43*a,b,c,d*, and part of the second wired connection 82, as well as any other component situated within the radio housing 27 may be mounted in the radio housing 27 by any conventional means. In one embodiment, these components may be potted in the radio housing 27, meaning that the components are placed within the radio housing 27 and the radio housing 27 is thereafter filled with an epoxy-type filler, such as a urethane compound or a silicon compound.

Figure 11:
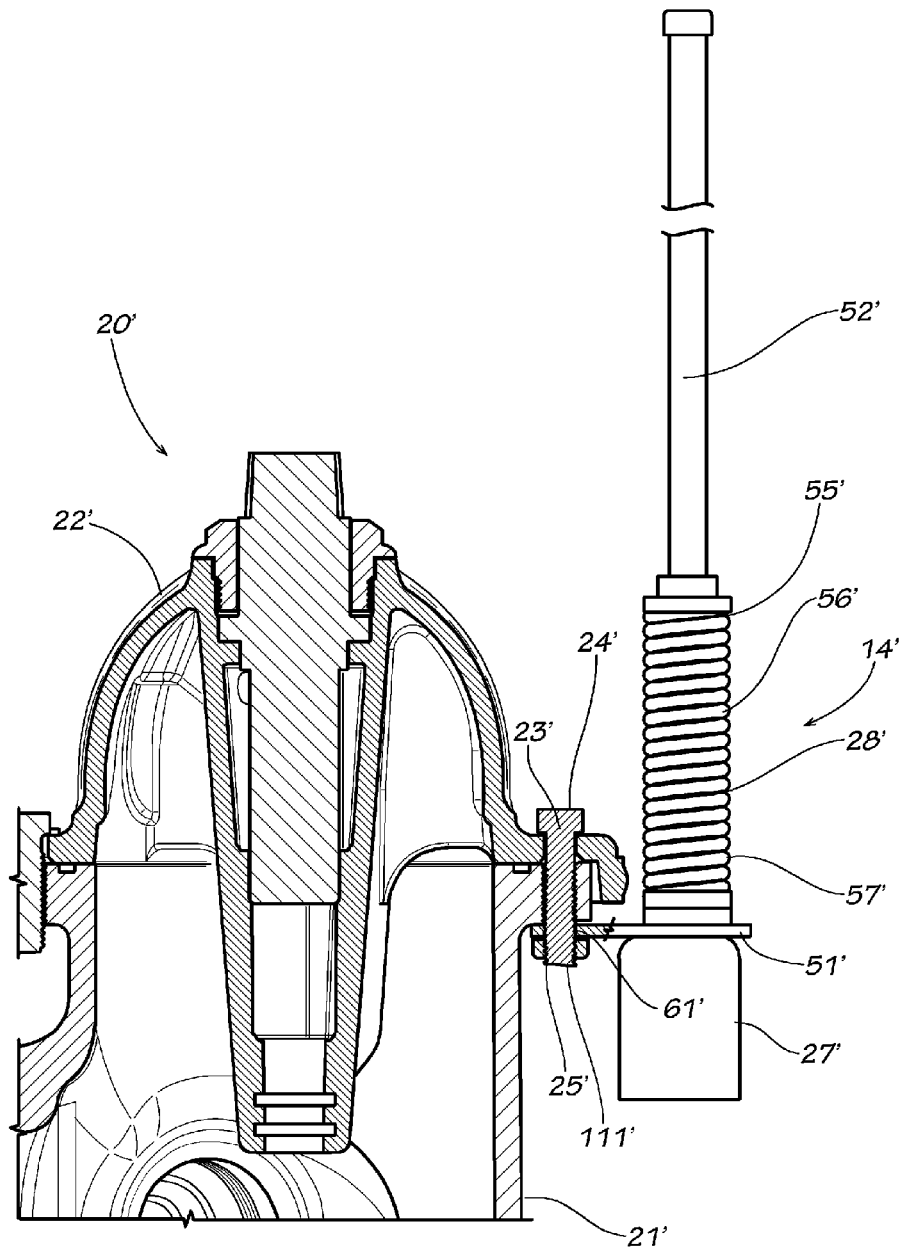
FIG. 11 is a diagram of a second embodiment of a relay module attached to a fire hydrant, according to various implementations of the present disclosure.

FIG. 11 shows a second embodiment of a relay module 14' mounted on a fire hydrant 20', with the fire hydrant 20' in cross-sectional view. The fire hydrant 20' includes a hydrant body 21' and a bonnet 22' coupled together with a plurality of fasteners 23' including bolts 24' and nuts 25'. The relay module 14' includes radio housing 27', an antenna 80' (not shown), and a mast 52'. The relay module 14' also includes a spring 28' with an upper section 55', a middle section 56', and a lower section 57'. In this embodiment, upper section 55', the middle section 56', and the lower section 57' all have diameters equal to each other. The relay module 14' also includes a mounting bracket 51' with a mounting fastener hole 61'. In one embodiment, the bolts 24' are too short to mount the relay module 14' by the mounting bracket 51' through the mounting fastener hole 61'. To solve this problem, one solution is to replace one of the bolts 24' with a replacement bolt 111' with an equal diameter to the bolts 24' and a longer body than the bolts 24' to allow the mounting bracket 51' to mount to the fire hydrant 20' through the mounting fastener hole 61.

Figure 12:
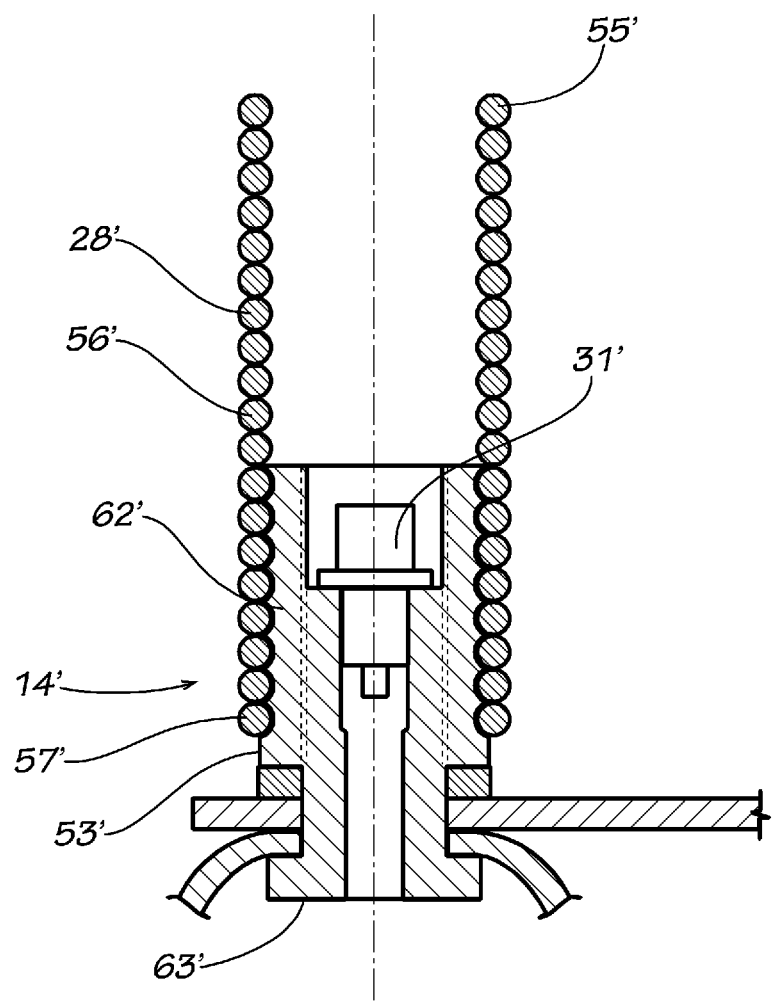
FIG. 12 is a sectional view of the embodiment of the relay module of FIG. 7.

FIG. 12 shows a cross-sectional view of the relay module 14' of FIG. 11. As notated in FIG. 12, the spring 28' may be a 1¼-inch inner diameter (ID) spring. The relay module 14' also includes a lower spring insert 53' having a outer hex fastener 62', an inner hex fastener 63', and a RF connector 31'. As notated in FIG. 12, the outer hex fastener 62' and the inner hex fastener 63' may be stock hex spring fasteners and may have, for example, a 0.570-inch female connection, and the RF connector 31' may be a standard, over-the-counter RF connector such as Amphenol part no. 122406.

Figure 13:
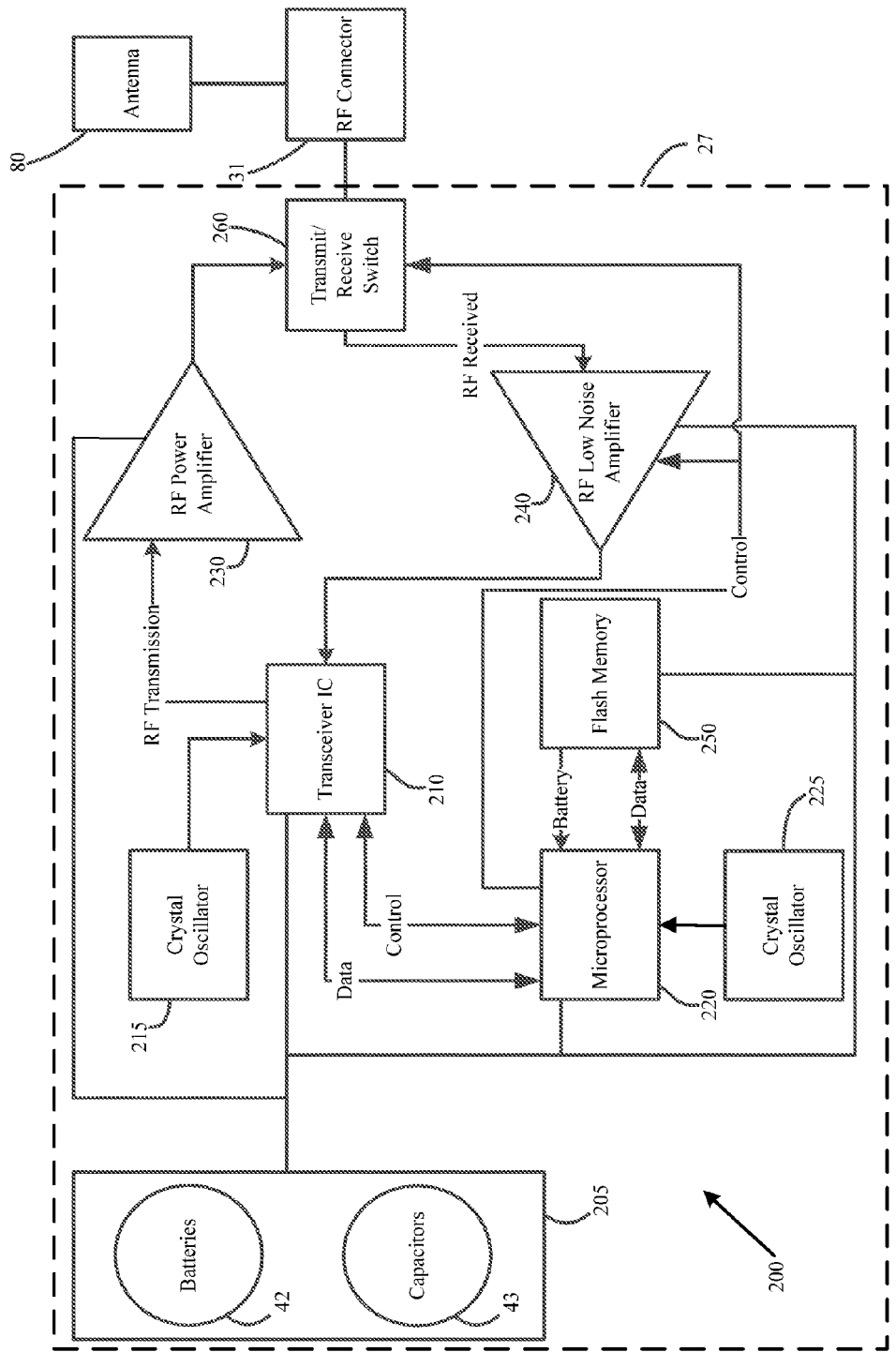
FIG. 13 is a circuit diagram of the relay module of FIG. 2.

FIG. 13 shows a circuitry diagram of the RF circuit 200. The relay module 14 of FIG. 2 may also include the RF circuit 200 to enable the device to communicate wirelessly with another device. The RF circuit 200 of FIG. 13 includes the batteries 42, capacitors 43, the antenna 80, the circuit board 41 and the RF connector 31. The batteries 42 and capacitors 43 are connected in parallel to form a power supply 205. In one embodiment, the batteries 42 and capacitors 43 are supplied as completed units. For example, the power supply 205 may be multiple preassembled power units placed in parallel, each power unit including four batteries 42 and two capacitors 43 placed in parallel. Other preassembled power units with different combinations of batteries 42 and capacitors 43 may also be used in various embodiments. The capacitors 43, for example, may also be Hybrid Layer Capacitors ("HLCs"), which are manufactured and sold by Tadiran Batteries Ltd. HLCs may be included in power units, such as the power supply 205, with batteries, such as batteries 42. The power supply 205 may also be a direct AC line power or solar power, any other commonly-used power source, or any combination of power sources thereof.

The circuit board 41 includes at least one of a transceiver integrated circuit (IC) 210, a microprocessor 220, an RF power amplifier 230, an RF low noise amplifier 240, crystal oscillators 215, 225, a transmit/receive switch 260, and memory 250 (e.g., flash memory, RAM, ROM, etc.). The power supply 205, as needed, powers at least one of the transceiver integrated circuit (IC) 210, the microprocessor 220, the RF power amplifier 230, the RF low noise amplifier 240, and the memory 250 (e.g., flash memory, RAM, ROM, etc.). The devices may include the crystal oscillators 215, 225 connected to the transceiver IC 210 and the microprocessor 220. Each device may also include the transmit/receive switch 260. A data line may connect the antenna 80 to the transmit/receive switch 260.

Data received by the antenna 80 is fed into the RF low noise amplifier 240 and then to the transceiver IC 210. The transceiver IC 210 is connected to the microprocessor 220 and the RF power amplifier 230. For transmission, data may be sent to the antenna 80 and, thereby, to another remotely located device. The RF circuit 200 of each device may be configured on various radio topologies in various embodiments, including point-to-point, point-to-multipoint, mesh networking, and Star, among others. The RF circuit may be configured to communicate in multiple topologies or in one of multiple topologies. In addition, one of ordinary skill in the art would understand that the RF circuit 200 may include any combination of elements described herein, or other elements commonly used and understood in the art, necessary for the RF circuit 200 to function to communicate wirelessly with another device.

In regions where dozens of inches of snowfall may accumulate, the locations of fire hydrants are often marked by snow poles (also referred to as hydrant markers or simply markers). The mast 52 acts as a snow pole and extends up from the top of the fire hydrant 20, as shown in FIG. 2, such that when snow completely covers the fire hydrant 20, the location of the fire hydrant 20 may still be visually known by the mast 52 sticking up through the snow. Then, when snowplows are deployed to clear the streets, the snowplow operators will be able to see the mast 52 and visually know the location of the fire hydrant 20. The operators will then try to avoid a collision with the fire hydrant 20, thereby reducing destruction of the property. Further, in the event of an emergency, fire fighters may more easily identify and locate fire hydrant 20 by spotting the snow pole. Because many snow poles may already exist in some regions, the relay modules 14 as described herein may be retrofitted into the existing snow poles.

The spring 28 and the mounting bracket 51 may also function to offset the relay module 14 from the fire hydrant 20 to allow use of the fire hydrant 20. To turn on water flow through the fire hydrant 20, the operating nut 26 is turned by a wrench to open a water valve inside the fire hydrant 20. The mounting bracket 51 mounts the relay module 14 an offset distance away from the fire hydrant to allow the turning of the wrench on the operating nut 26. Further, the spring 28 may be flexed to pull the mast 52, the antenna 80, and the wired connection 81 further away from the fire hydrant 20 so that the wrench on the operating nut 26 may be turned. In addition, the offset created by the mounting bracket 51 also prevents the mast 52 from striking the fire hydrant 20 during high wind or other weather conditions that may cause the spring 28 to flex, pushing the mast 52 towards the fire hydrant 20. This offset serves to prevent damage to and disruption of the functioning of the relay module 14, including the mast 52, antenna 80, and wired connection 81.

As suggested above, the relay modules 14 may be attached to other utility structures, including other public or government property or assets. For example, the relay modules 14 may be supported by telephone poles in neighborhoods where there are plenty of telephone poles. The relay modules 14 may also be supported by road signs, such as stop signs or other traffic regulation signs. Also, many neighborhoods may have several metallic transformer cabinets for providing electricity to individual residences. In some embodiments, the relay modules 14 may be attached to a portion of the transformer cabinets. Many neighborhoods may also have several telephone junction boxes each servicing several homes. In some embodiments, the relay modules 14 may be attached to the telephone junction boxes as well.

In other embodiments, the relay modules 14 may be installed on any structure within utility easements. For example, the relay modules 14 may be attached to a tree or shrub or attached to a man-made structure, such as a building, wall, pipe, bridge, or other object. The relay modules 14 may also be mounted on a stake, pole, or other instrument that is supported in the ground at any desirable location. By placing a stake or pole where needed, the relay modules 14 can be positioned in locations that are near the transmitting meters 16 while at the same time being out of the way of pedestrians or out of sight from casual observers.

The relay modules 14 may be configured to simply receive meter data from the meters 16 and relay the data to the utility provider 12, via other relay modules 14 as needed. Some relay modules 14 may be configured to also provide metering functions. However, according to many implementations of the present disclosure, the relay modules 14 do not contain any metering functions, but simply are configured to relay the meter data. Other implementations include the relaying of other types of data, including data that is not related to meter data, including implementations that combine such data with meter data and implementations that do not include any meter data.

The relay modules 14 or the collector units of the utility provider 12 may be configured to poll the meters 16 at certain times of the day or month to obtain the meter information from the respective sets of the meters 16. Also, communication with other relay modules 14 and the utility provider 12 may be scheduled at specific times to avoid the need to transmit and receive a large number of signals within a small timeframe.

Where materials are chosen for the elements of this assembly—particularly, plastics or metals—similar material choices may also be used and would be obvious to one of ordinary skill in the art. In one embodiment, the mast 52 and the radio housing 27 are plastic; the mounting bracket 51, upper spring insert 32, outer hex spring fastener 62, inner hex fastener 63, and jam nut 54 are stainless steel; and the spring 28 is a high-carbon steel. However, these components may be made of different materials or combinations of materials in other embodiments. Furthermore, some embodiments include masts with no cavities, antennas located outside the cavities, and embodiments without a mast wherein an antenna itself also serves as a marker.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

The invention claimed is:
1. A relay module comprising:
a mast having an inner surface and an outer surface, the inner surface defining a cavity, the mast defining a utility structure marker;
an antenna disposed within the cavity;
a spring assembly comprising a spring, an upper spring insert attached to the mast, and a lower spring insert;
a radio housing; and
a mounting device positioned between the radio housing and the mast, coupled to the mast and engageable with a utility structure, the mounting device attached to the lower spring insert.

2. The relay module of claim 1, wherein the mast is movable relative to the mounting device.

3. The relay module of claim 1, wherein the spring includes an upper section, a middle section, and a lower section, the middle section having a diameter larger than the upper section, the upper section having a diameter equal to the lower section.

4. The relay module of claim 1, further comprising an RF connector disposed within the spring assembly and connected to the antenna.

5. The relay module of claim 1, wherein the mounting device is a mounting bracket.

6. The relay module of claim 5, wherein the mounting bracket includes a fastener hole.

7. The relay module of claim 1, a wherein the radio housing is coupled to the mounting device.

8. The relay module of claim 7, wherein the radio housing includes at least one battery.

9. The relay module of claim 7, wherein the radio housing includes a circuit board.

10. The relay module of claim 1, wherein the utility structure is a fire hydrant.

11. The relay module of claim 10, wherein:

the fire hydrant includes a bonnet and a hydrant body, the bonnet coupled to the hydrant body by a plurality of fasteners; and the mounting device is engageable with the fire hydrant by a fastener of the plurality of fasteners.

12. The relay module of claim 11, wherein:

the plurality of fasteners includes nuts and bolts; and the mounting device includes a fastener hole sized to accept a bolt of the plurality of fasteners.

13. A relay module system comprising:

a utility structure;

a mast having an inner surface and an outer surface, the inner surface defining a cavity, the mast defining a utility structure marker, the cavity extending above the utility structure;

an RF circuit including an antenna, the antenna disposed within the cavity of the mast;

a radio housing; and a mounting device located between the radio housing and the mast, fastening the mast to the utility structure, coupled to the radio housing.

14. The relay module system of claim 13, wherein the utility structure is a fire hydrant, the fire hydrant including a bonnet and a hydrant body, the bonnet coupled to the hydrant body by a plurality of fasteners.

15. The relay module system of claim 14, wherein the mounting device is fastened to the fire hydrant by a mounting bracket, the mounting bracket engaging one fastener of the plurality of fasteners.

16. The relay module system of claim 13, further comprising a spring assembly coupling the mast to the mounting device.

17. The relay module system of claim 16, wherein the spring assembly comprises a spring, an upper spring insert attached to the mast, and a lower spring insert.

18. The relay module system of claim 17, wherein the spring includes an upper section, a middle section, and a lower section, the middle section having a diameter larger than the upper section, the upper section having a diameter equal to the lower section.

19. The relay module system of claim 17, wherein the mounting device is attached to the lower spring insert.

20. The relay module system of claim 13, wherein the RF circuit includes a circuit board and at least one battery, the radio housing containing the circuit board and the at least one battery of the RF circuit.

* * * * *